(No Model.)
J. F. GENT.
APPARATUS FOR MASHING.
No. 313,070. Patented Mar. 3, 1885.
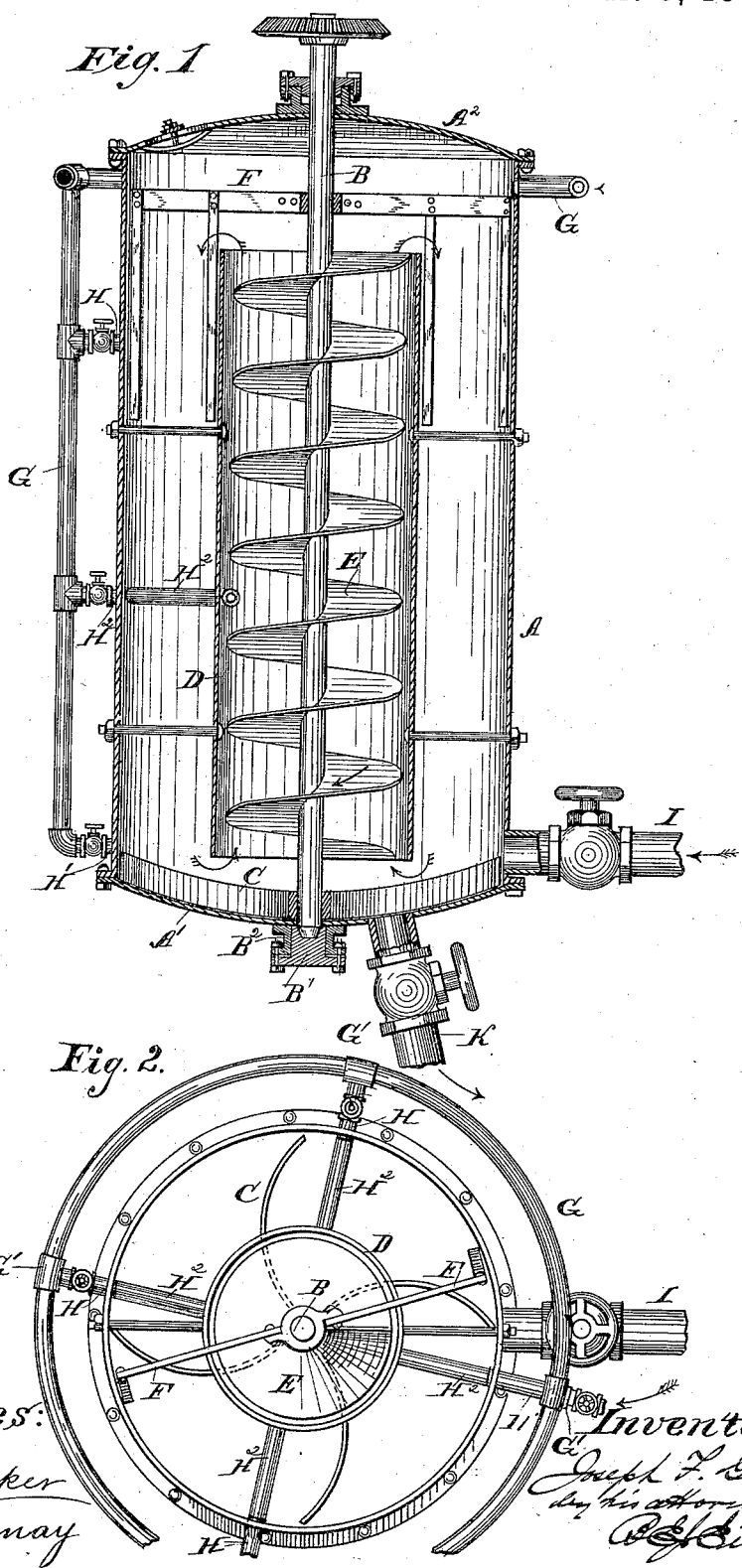

UNITED STATES PATENT OFFICE.

JOSEPH FRANKLIN GENT, OF COLUMBUS, INDIANA.

APPARATUS FOR MASHING.

SPECIFICATION forming part of Letters Patent No. 313,070, dated March 3, 1885.

Application filed April 12, 1884. (No model.)

*To all whom it may concern:*

Be it known that I, JOSEPH FRANKLIN GENT, a citizen of the United States, residing at Columbus, in the county of Bartholomew and State of Indiana, have invented certain new and useful Improvements in Apparatus for Mashing; and I do hereby declare the following to be a full, clear, and exact description of the invention, such as will enable others skilled in the art to which it appertains to make and use the same.

This invention relates to that class of mashing-machines in which means are provided for effecting a circulation of the mash.

My improvement consists of an upright mashing-machine the tank of which contains an upright rotating screw within an open-ended tube, so as to circulate the mash by lifting it from near the bottom of the tank and discharging it near the top, the screw-shaft being provided with a spider below the open-ended tube to stir the mash in the bottom of the tank.

It further consists in leading steam-pipes to the tank as well as to the open-ended tube, and of other features of construction, all of which will be specifically pointed out by separate claims at the close of this specification.

In order that my invention may be clearly understood, I have illustrated in the annexed drawings, and will proceed to describe, a practical form thereof.

Figure 1 is a vertical section of my improved mashing-machine. Fig. 2 is a horizontal section thereof.

The same letters of reference indicate identical parts in both the figures.

In the machine illustrated the tank A is an upright cylinder, closed at the bottom by a head, A', and at the top by a head, A². The heads A' A² are bolted to the cylinder, so that either or both may be readily detached in case it is necessary to get access to the interior of the machine. An upright shaft, B, is arranged centrally within the tank A. The lower end of the shaft is supported upon a step-bearing, B'. A solid plug, fitted in a box, B², secured to the lower head, A', as a gland, is fitted to a stuffing-box, so that wear may be taken up or the step removed for cleaning or repairing purposes. The upper end of shaft B passes through a suitable stuffing-box on the head A', and is provided with a bevel-wheel, by which it is to be turned. A spider, C, is secured to the shaft B, so as to sweep around in the bottom of the tank very close to the head A', to constantly stir the mash at this point and prevent the settling of any portion. The arms of this spider may be curved, as shown, and somewhat feathered, so as to act on the mash with a lifting tendency. The mash is drawn from near the bottom of the tank into the lower end of an open-ended tube, D, and discharged from the upper end of said tube by the screw E, secured to shaft B within said tube. On escaping from the upper end of tube D, the mash is operated on by a stirrer, F, also secured to shaft B. The mash is heated by steam injected at various points into both the tank and the tube D.

In the machine illustrated, the steam is led from a circular pipe, G, arranged around the top of tank A, into four stand-pipes, G', each of which is provided with two service-pipes, H and H', for delivering steam into the tank, and with a third service-pipe, H², which delivers steam into the tube D. Each service-pipe is provided with a suitable valve or cock to regulate the amount of steam delivered. The service-pipes may be arranged as shown, or may be distributed differently. A manhole is formed in head A², through which the materials may be introduced into the tank; or they may be forced in at the bottom through a pipe, I. The man-hole is left open or closed, according as the mashing is to be conducted at low temperature or at high temperature and pressure. A pipe, K, is provided for drawing the mash from the bottom of the tank. The pipes I and K are provided with suitable valves.

I claim as my invention—

1. The combination, substantially as before set forth, of the upright tank, the upright open-ended tube within the tank, the rotating screw within the tube, and the rotating spider secured to the lower end of the screw-shaft so as to operate in the bottom of the tank.

2. The combination, substantially as before set forth, of the upright tank, the upright open-ended tube within the tank, the rotating screw within the tube, the rotating spider secured to the lower end of the screw-shaft so as to operate in the bottom of the tank, and the rotating stirrer in the upper end of the tank.

3. The combination, substantially as before set forth, of the tank, the open-ended tube, and rotating screw within the same, and steam service-pipes leading, respectively, into the tank and into the said tube.

In testimony whereof I affix my signature in presence of two witnesses.

JOSEPH FRANKLIN GENT.

Witnesses:
W. M. HANNAY,
E. T. WALKER.